(12) United States Patent
Takeda et al.

(10) Patent No.: US 7,701,589 B2
(45) Date of Patent: Apr. 20, 2010

(54) THREE-DIMENSIONAL SHAPE MEASURING METHOD AND APPARATUS

(75) Inventors: Mitsuo Takeda, Hachioji (JP); Michal Emanuel Pawlowski, Atsugi (JP); Youhei Sakano, Yamato (JP)

(73) Assignee: The University of Electro-Communications, Tokyo (JP)

( * ) Notice: Subject to any disclaimer, the term of this patent is extended or adjusted under 35 U.S.C. 154(b) by 236 days.

(21) Appl. No.: 11/793,604

(22) PCT Filed: Dec. 22, 2005

(86) PCT No.: PCT/JP2005/023586

§ 371 (c)(1),
(2), (4) Date: Jul. 10, 2007

(87) PCT Pub. No.: WO2006/068217

PCT Pub. Date: Jun. 29, 2006

(65) Prior Publication Data

US 2008/0111996 A1 May 15, 2008

(30) Foreign Application Priority Data

Dec. 22, 2004 (JP) .............................. 2004-371632

(51) Int. Cl.
*G01B 11/02* (2006.01)
(52) U.S. Cl. ...................................... 356/511; 356/497
(58) Field of Classification Search .................. 356/479, 356/497, 511
See application file for complete search history.

(56) References Cited

U.S. PATENT DOCUMENTS

| 4,641,971 | A | * | 2/1987 | Korth ......................... 356/497 |
| 5,598,265 | A | | 1/1997 | de Groot |
| 6,493,093 | B2 | * | 12/2002 | Harasaki et al. ............. 356/497 |
| 6,501,553 | B1 | | 12/2002 | Ogawa et al. |
| 6,734,978 | B2 | * | 5/2004 | Adachi ....................... 356/497 |
| 2008/0123103 | A1 | * | 5/2008 | Fujii ........................... 356/496 |

FOREIGN PATENT DOCUMENTS

| JP | 63-037202 A | 4/1994 |
| JP | 08-285561 A | 11/1996 |
| JP | 2000-266508 A | 9/2000 |
| JP | 2001-066122 A | 3/2001 |

* cited by examiner

*Primary Examiner*—Patrick J Connolly
(74) *Attorney, Agent, or Firm*—NDQ&M Watchstone LLP

(57) ABSTRACT

Three-dimensional shape measuring instrument (white interferometer) for measuring the three-dimensional shape of an object to be measured by using white interference fringes, which detects the position where the amplitude of the white interference fringes takes on a maximum value with high accuracy in a short calculation processing time. An envelope distribution of the amplitude of the white interference fringes produced by the interference between the returning light from a reference mirror (6) and the returning light from an object (7) to be measured is determined, and an approximate position where the contrast of the white interference fringes is the highest is determined using this envelope distribution. The interference fringes of two or more different spectrum band components included in the white interference fringes are extracted, and the positions which are near the determined approximate position and at which the phases of the interference fringes of the different spectrum band components take on the same values are determined.

14 Claims, 12 Drawing Sheets

SAMPLING POINT

1 ⟷ m
m+1 ⟷ 2m
2m+1 ⟷ 3m · · · · · · · · · ·

THREE-DIMENSIONAL SHAPE MEASURING METHOD AND APPARATUS

TECHNICAL FIELD

The present invention relates to a three-dimensional shape measuring apparatus (white light interference measuring apparatus) which measures a three-dimensional shape of an object to be measured by scanning an optical path length from a white light source to the object to be measured and detecting a position where the optical path length is set equal to an optical path length from the white light source to a reference mirror.

BACKGROUND ART

The recent advances in microfabrication technologies have developed higher integration of so-called micromachines, LSIs and the like. Thus, it is desired to improve accuracy in measuring a three-dimensional shape of a microstructure having a complex step shape. As an apparatus for measuring the three-dimensional shape of the microstructure having the complex step shape, a white light interference measuring apparatus using a light source (white light source) having a broadband spectrum has been proposed.

In the white light interference measuring apparatus, a return light reflected from an object to be measured after having reached the object from the white light source and a return light reflected from a reference mirror after having reached the reference mirror from the white light source are made to interfere with each other. Thus, white light fringes are found. Thereafter, an optical path length from the white light source to the object to be measured is scanned by the use of a piezoelectric element or the like to detect a position where the amplitude of the white light fringes is set the maximum, in other words, a position where the optical path length from the white light source to the object to be measured is set equal to an optical path length from the white light source to the reference mirror. Accordingly, a three-dimensional shape of the object to be measured is measured.

Moreover, such a white light interference measuring apparatus is used not only for measurement of the three-dimensional shape of the microstructure but also for measurement of a film thickness of a dielectric multilayer film, for structural analysis of a continuum (diffuser) such as eyegrounds and skin, for example, and the like.

In such a white light interference measuring apparatus, it is important to accurately specify the position where the amplitude of the white light fringes is set the maximum. Methods heretofore proposed as a method for identifying the position where the amplitude of the white light fringes is set the maximum are classified broadly into the following two methods.

One is a method using Fourier transform to find a position where the envelope of the amplitude of interference fringes is set the maximum in a signal region. The other is a method using a phase gradient of a Fourier spectrum in a spectral region to calculate a position where the amplitude of white light fringes is set the maximum. In a communication theory, it is generally known that phase information is more reliable to cope with nonlinear characteristics of a detector or quantization noise than signal amplitude information. This means that, in the case of white light fringes, the use of not amplitude information but phase information can improve accuracy of identifying the position where the amplitude of the white light fringes is set the maximum.

Moreover, in Patent Document 1, described is a method for identifying a $0^{th}$-order fringe position in the following manner. Specifically, in the method, on the basis of interference fringe data on an object to be measured, which are respectively obtained by interference lights having a plurality of wavelengths, extracted is phase information for each of the interference fringe data corresponding to the interference lights having the respective wavelengths. Thereafter, the phase information is used to prepare a sinusoidal function for each interference fringe data. Subsequently, a phase of the sinusoidal function is determined for each of the interference fringe data so as to set the interference fringe data to have the maximum value at a position of predetermined coordinates within a measurement region for the object to be measured.

Patent Document 1: Japanese Patent Application Laid-open Publication No. 2000-266508

SUMMARY OF INVENTION

Meanwhile, in the method using the envelope of the amplitude of interference fringes as described above, a curve formed by the envelope has a gradual change at a peak position of the amplitude. Thus, there is a problem that a minute change in the envelope near the peak due to measuring noise or the like causes a significant measuring error.

Moreover, as described above, in the method using the phase gradient of the Fourier spectrum, an operation such as a least squares method is performed for estimation of the phase gradient. Thus, an amount of calculations becomes so enormous that the operation requires a long time. Moreover, in this method, when a light source has a small spectrum width, the available amount of phase information is reduced. Thus, there is a problem of reduction in the accuracy of identifying the position where the amplitude of the white light fringes is set the maximum.

Moreover, in the technology described in Patent Document 1, when the sinusoidal function is prepared for each interference fringe data by the use of the phase information, interposition between the adopted data (sample points) is carried out. Thus, there is a problem that an error caused by such interposition lowers the accuracy of identifying the position where the amplitude of the white light fringes is set the maximum.

Thus, the present invention is proposed in consideration of the foregoing circumstances. It is an object of the present invention to provide a three-dimensional shape measuring apparatus (white light interference measuring apparatus), which measures a three-dimensional shape of an object to be measured by the use of white light fringes, and a three-dimensional shape measuring method, both of which make it possible to accurately specify a position where the amplitude of the white light fringes is set the maximum while shortening processing time required for operations.

In order to solve the problems described above and to achieve the foregoing object, a three-dimensional shape measuring method according to a first aspect of the present invention is for measuring a three-dimensional shape of an object (7) to be measured by changing an optical path length from a light source (1) generating an illumination light having a broadband spectrum to the object (7) to be measured or an optical path length from the light source (1) to a reference mirror (6) and by detecting a position where the optical path lengths are set equal. The three-dimensional shape measuring method includes the steps of: finding an approximate position including a position where an envelope of the amplitude of white light fringes takes a maximum value, the fringes being caused by interference between a return light of the illumination light from the reference mirror (6) and a return light of the illumination light from the object (7) to be measured; extracting interference fringes of at least two spectral band components different from each other, which are included in the white light fringes; and determining a position where the optical path length from the light source to the object to be measured is set equal to the optical path length from the light source to the reference mirror by finding a position where phases of the interference fringes of the spectral band components different from each other take values equal to each other near the approximate position.

Unlike a conventional three-dimensional shape measuring method using only one kind of black-and-white fringe information, the three-dimensional shape measuring method described above uses phase information of the interference fringes broken into spectra of R (red), G (green), B (blue) and the like, for example. Thus, it is possible to accurately specify a position where the amplitude of the white light fringes is set the maximum.

Moreover, the three-dimensional shape measuring method does not have a problem such as an increase in an amount of calculations due to the use of a least squares method and the like. Furthermore, even if the available amount of information is reduced due to a small spectrum width of the light source, high specification accuracy can be maintained by the use of a relationship with other components.

A three-dimensional shape measuring apparatus according to a second aspect of the present invention is a three-dimensional shape measuring apparatus using white light interference to measure a three-dimensional shape of an object (7) to be measured by scanning an optical path length from a light source (1) generating an illumination light having a broadband spectrum to the object (7) to be measured or an optical path length from the light source (1) to a reference mirror (6) and by detecting a position where the optical path lengths are set equal. In the apparatus, an envelope distribution of the amplitude of white light fringes is obtained by the use of a fringe analysis method, the white light fringes being caused by interference between a return light of the illumination light from the reference mirror (6) and a return light of the illumination light from the object (7) to be measured. Thereafter, by the use of the envelope distribution, an approximate position where contrast of the white light fringes is maximized is found. Moreover, interference fringes of at least two spectral band components different from each other, which are included in the white light fringes, are extracted. Subsequently, a position is found where phases of the interference fringes of the spectral band components different from each other take values equal to each other near the approximate position where the contrast of the white light fringes is maximized. On the basis of the position thus found, a position is determined where the optical path length from the white light source to the object to be measured is set equal to the optical path length from the white light source to the reference mirror.

Unlike a conventional three-dimensional shape measuring apparatus using only one kind of black-and-white fringe information, the three-dimensional shape measuring apparatus described above uses phase information of the interference fringes broken into spectra of R (red), G (green), B (blue) and the like, for example. Thus, it is possible to accurately specify a position where the amplitude of the white light fringes is set the maximum.

Moreover, the three-dimensional shape measuring apparatus does not have a problem such as an increase in an amount of calculations due to use of a least squares method and the like. Furthermore, even if an amount of available information is reduced due to a small spectrum width of the light source, high specification accuracy can be maintained by the use of a relationship with other components.

A three-dimensional shape measuring apparatus according to a third aspect of the present invention is a three-dimensional shape measuring apparatus which measures a three-dimensional shape of an object (7) to be measured, the apparatus including: a light source (1) generating an illumination light having a broadband spectrum; optical path formation means (5) for forming optical paths for the illumination light outputted from the light source (1) to reach a reference mirror (6) and the object (7) to be measured; optical path length changing means (8) for changing an optical path length from the light source (1) to the object (7) to be measured or an optical path length from the light source (1) to the reference mirror (6); detection means for detecting a position where the respective optical path lengths are set equal to each other; imaging means (10) into which a first return light of the illumination light, which is a light reflected from the reference mirror (6), and a second return light of the illumination light, which is a light reflected from the object (7) to be measured, are entered; approximate position determination means (13) for determining, on the basis of an imaging signal outputted from the imaging means (10), an approximate position including a position where an envelope of the amplitude of white light fringes takes a maximum value, the fringes being caused by interference between the first return light and the second return light; phase calculation means (15) for calculating phases of interference fringes of at least two spectral band components different from each other, which are included in the white light fringes, near the approximate position; and displacement calculation means (16) for calculating a displacement on a surface of the object to be measured by finding a position where the phases of the interference fringes of the spectral band components different from each other obtained by the phase calculation means (15) take values equal to each other.

The approximate position determination means (13) in the three-dimensional shape measuring apparatus performs sampling of light intensity of the white light fringes every time where the optical path length may be changed by a certain fixed degree by the optical path length changing means (8). Moreover, after a standard deviation of a fixed number of consecutive sampling values starting from a first sampling value may be calculated, a standard deviation of a fixed number of consecutive sampling values starting from a second sampling value may be calculated. Subsequently, standard deviations are sequentially calculated. Thus, a range including a group of sampling values to have the maximum standard deviation may be determined to be the approximate position including the position where the envelope of the amplitude of the white light fringes takes a maximum value.

Moreover, the approximate position determination means (13) in the three-dimensional shape measuring apparatus performs sampling of light intensity of the white light fringes every time where the optical path length may be changed by a certain fixed degree by the optical path length changing means (8). Moreover, after a standard deviation of a fixed number m of consecutive sampling values starting from a first sampling value may be calculated, a standard deviation of a fixed number m of consecutive sampling values starting from a [m+1]th sampling value may be calculated. Next, a standard deviation of a fixed number m of consecutive sampling values starting from a [2m+1]th sampling value may be calculated. Subsequently, standard deviations may be sequentially calculated. Within a range including a group of sampling values to have the maximum standard deviation and a group of sampling values adjacent thereto, a standard deviation of a fixed number m of consecutive sampling values starting from a first sampling value may be calculated. Thereafter, a standard deviation of a fixed number m of consecutive sampling values starting from a [m/2+1]th sampling value is calculated. Next, a standard deviation of a fixed number m of consecutive sampling values starting from a [2m/2+1]th sampling value may be calculated. Subsequently, standard deviations may be sequentially calculated. Thus, a range including a group of sampling values to have the maximum standard deviation may be determined to be the approximate position including the position where the envelope of the amplitude of the white light fringes takes a maximum value.

Moreover, the approximate position determination means (13) in the three-dimensional shape measuring apparatus performs sampling of light intensity of the white light fringes every time where the optical path length may be changed by a certain fixed degree by the optical path length changing means (8). Moreover, an absolute value of a difference between first and last sampling values within a range of a fixed number m of consecutive sampling values starting from a first sampling value may be calculated. Thereafter, an absolute value of a difference between first and last sampling values within a range of a fixed number m of consecutive sampling values starting from a [m+1]th sampling value may be calculated. Next, an absolute value of a difference between first and last sampling values within a range of a fixed number m of consecutive sampling values starting from a [2m+1]th sampling value may be calculated. Subsequently, absolute values of differences may be sequentially calculated. Thus, a range including a group of sampling values to find a maximum absolute value of a difference may be determined to be the approximate position including the position where the envelope of the amplitude of the white light fringes takes a maximum value.

Moreover, the imaging means (10) in the three-dimensional shape measuring apparatus may be a color camera and may output an imaging signal for each of the spectral band components different from each other.

Moreover, the imaging means (10) in the three-dimensional shape measuring apparatus may be a monochrome camera and may include spectral band component distribution means for distributing imaging signals outputted from the monochrome camera to the spectral band components different from each other.

BEST MODE FOR CARRYING OUT THE INVENTION

With reference to the drawings, detailed description will be given of three-dimensional shape measuring methods and three-dimensional shape measuring apparatuses according to embodiments of the present invention.

First Embodiment

A three-dimensional shape measuring method according to the present invention is a three-dimensional shape measuring method for measuring a three-dimensional shape of an object to be measured by changing an optical path length from a light source generating an illumination light having a broadband spectrum to the object to be measured or an optical path length from the light source to a reference mirror and by detecting a position where the optical path lengths are set equal. The method is executed in a three-dimensional shape measuring apparatus of the present invention to be described below.

Figure 1:
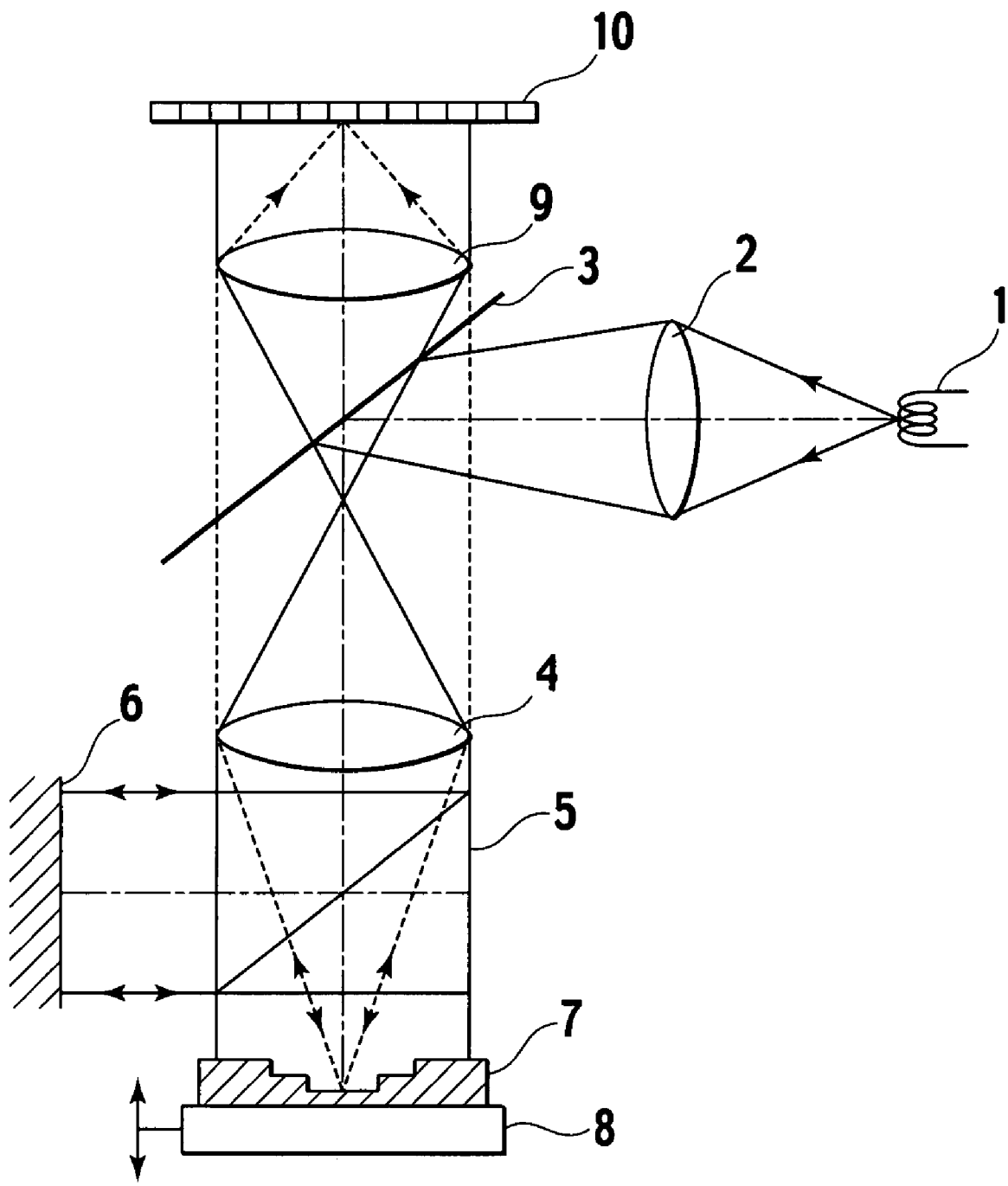
FIG. 1 is a side view showing an entire configuration of a three-dimensional shape measuring apparatus according to a first embodiment of the present invention.

FIG. 1 is a side view showing an entire configuration of a three-dimensional shape measuring apparatus according to a first embodiment of the present invention.

The three-dimensional shape measuring apparatus according to the present invention is a three-dimensional shape measuring apparatus using white light interference to measure a three-dimensional shape of an object to be measured by scanning an optical path length from a light source generating an illumination light having a broadband spectrum, such as a white light source, to the object to be measured or an optical path length from the light source to a reference mirror and by detecting a position where the optical path lengths are set equal.

In this embodiment, as shown in FIG. 1, the three-dimensional shape measuring apparatus is formed by the use of a Michelson interferometer. However, the three-dimensional shape measuring apparatus of the present invention is not limited to the configuration of such an interferometer but can be formed by the use of a Mirau interferometer or interferometers having other configurations, for example.

In this three-dimensional shape measuring apparatus, as shown in FIG. 1, an illumination light emitted from a white light source 1 such as a halogen lamp, a xenon lamp, a mercury lamp, a metal halide lamp, an SLD (super luminescence diode) and an LED (light emitting diode) is converged into a light beam by a condenser lens 2. Thereafter, the light beam is reflected by a half mirror 3, converted into a parallel light beam by an objective lens 4 and entered into a beam splitter 5 to be optical path formation means. The light beam entering into the beam splitter 5 is divided into two halves by the beam splitter 5.

One of the two halves obtained by dividing the light beam by the beam splitter 5 is entered into a reference mirror 6 and reflected by the reference mirror 6. Meanwhile, the other half of the light beam divided by the beam splitter 5 is entered into an object 7 to be measured and reflected by the object 7 to be measured. The object 7 to be measured can be moved in an optical axis direction by a piezoelectric element 8 and the like. A return light of the illumination light reflected from the reference mirror 6 and a return light of the illumination light reflected from the object 7 to be measured are entered into the beam splitter 5 again, respectively, and superimposed on each other in the beam splitter 5.

Note that the object 7 to be measured may be any of a reflector made of metal or the like and a continuum (diffuser) such as eyegrounds and skin or may be a dielectric multilayer film or the like to be measured for its film thickness.

The light beams superimposed in the beam splitter 5 are transmitted through the half mirror 3 after passing through the objective lens 4, converted into a parallel light beam by a relay lens 9, and entered into a color camera 10.

The above description was given of a light specularly reflected from a specular surface of the object. Meanwhile, a light diffracted or scattered by a structure on the surface of the object is focused onto an image sensor of the color camera 10 by the objective lens 4 and the relay lens 9 as indicated by broken lines in FIG. 1.

The color camera 10 is a camera having a function of separating the light into three colors, for example, R (red component) (hereinafter referred to as R), G (green component) (hereinafter referred to as G) and B (blue component) (hereinafter referred to as B) for measuring interference fringes. Specifically, the color camera 10 includes the three color separation function by receiving the incident white light through a colored filter, an optical element having spectral transmission characteristics, such as a dichroic mirror, or a color separation prism formed by combining those described above. In the color camera 10, for the incident light beam, independent interference fringes for the respective R, G and B components are recorded. Each of the R, G and B components has a certain wavelength interval (band).

Note that it is only necessary for the color camera 10 to be able to extract interference fringes of at least two spectral band components different from each other, which are included in white light fringes. Moreover, the spectral band components are not necessarily limited to R, G and B.

In the three-dimensional shape measuring apparatus, for detecting a position where the optical path length from the light source 1 to the object 7 to be measured and the optical path length from the light source 1 to the reference mirror 6 are set equal to each other, in other words, a position where an optical path difference is set 0, a plurality of interference fringes are sequentially recorded while relatively changing the optical path difference by using the piezoelectric element 8 to scan the object 7 to be measured (or the reference mirror 6) in the optical axis direction.

Interference fringe signals $I_R(Z)$, $I_G(z)$ and $I_B(Z)$ of the respective color components (the respective spectral components) in the white light fringes thus obtained can be expressed as in the following equations (1) to (3) in the order of R, G and B.

$$I_R(Z) = a_R + |S_R(z-h)| \times \cos\{k_R(z-h)\} \quad \text{(Equation 1)}$$

$$I_G(Z) = a_G + |S_G(z-h)| \times \cos\{k_G(z-h)\} \quad \text{(Equation 2)}$$

$$I_B(Z) = a_B + |S_B(z-h)| \times \cos\{k_B(z-h)\} \quad \text{(Equation 3)}$$

In the above equations (1) to (3), $a_i$ is a direct-current component of the white light fringes, and the second term is a product of $|S_i|$ representing an envelope that gives oscillation amplitude and a sine wave oscillating at a central wave number $k_i$ of each color component. Moreover, z is a scanning distance of the object 7 to be measured or the reference mirror 6, and h is a height of the object 7 to be measured.

Figure 2:
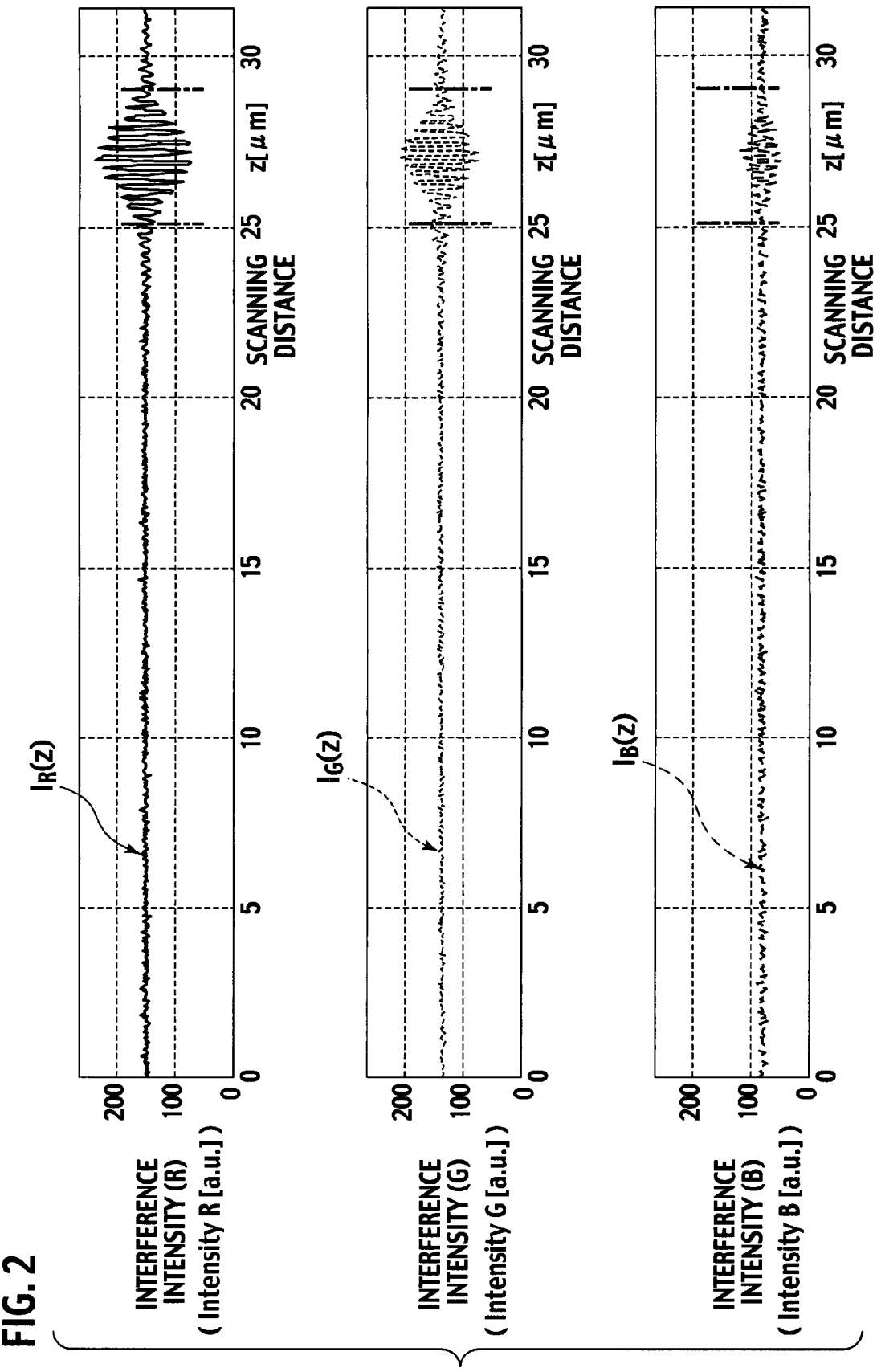
FIG. 2 is a graph showing interference fringe signals $I_R(Z)$, $I_G(Z)$ and $I_B(Z)$ in respective spectral bands obtained in the three-dimensional shape measuring apparatus according to the first embodiment.

FIG. 2 is a graph showing the interference fringe signals $I_R(Z)$, $I_G(Z)$ and $I_B(Z)$ in the respective spectral bands.

Figure 3:
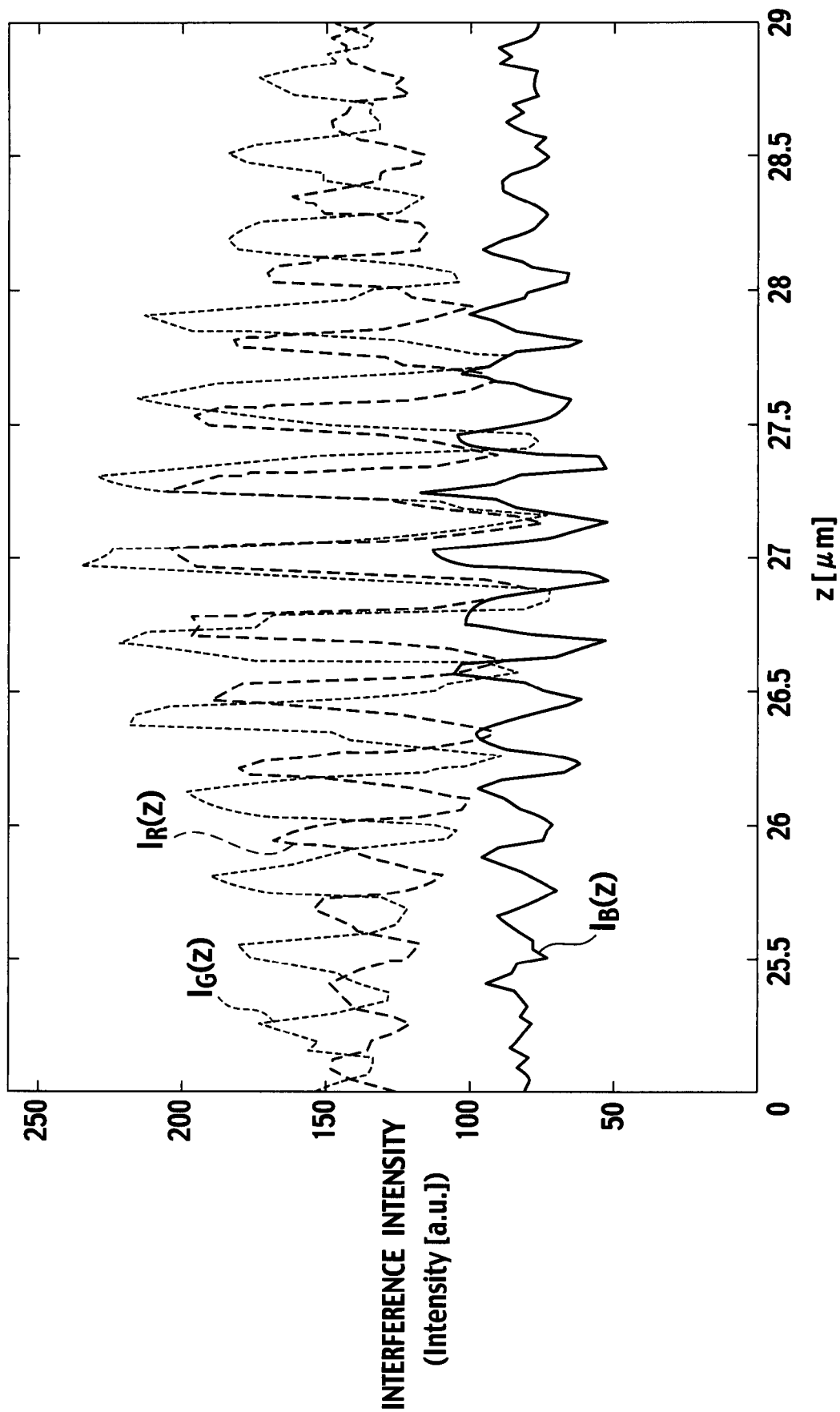
FIG. 3 is a graph showing the interference fringe signals $I_R(Z)$, $I_G(Z)$ and $I_B(Z)$ in the respective spectral bands obtained in the three-dimensional shape measuring apparatus according to the first embodiment, while superimposing partially enlarged regions with high fringe contrast in the respective signals on each other.

Moreover, FIG. 3 is a graph showing the interference fringe signals $I_R(Z)$, $I_G(Z)$ and $I_B(Z)$ in the respective spectral bands while superimposing partially enlarged regions with high fringe contrast in the respective signals on each other.

As shown in FIG. 2, the three interference fringe signals $I_R(Z)$, $I_G(Z)$ and $I_B(Z)$ are oscillated at different wave numbers determined by central wavelengths of the respective spectral bands. In each of the interference fringe signals $I_R(Z)$, $I_G(Z)$ and $I_B(Z)$, when the scanning distance z and the height h of the object 7 to be measured are equal, the optical path difference is set 0, the amplitude is set the maximum and the contrast is set the maximum. Specifically, positions where the amplitudes of the interference fringe signals $I_R(Z)$, $I_G(z)$ and $I_B(z)$ are set the maximum are equal to each other. Therefore, in this event, as shown in FIG. 3, the contrast of the white light fringes obtained by superimposing the interference fringe signals $I_R(Z)$, $I_G(z)$ and $I_B(Z)$ also takes a maximum value.

Therefore, if it is possible to accurately find the scanning distance z at which the contrast of the white light fringes is set the maximum, information on the height h can be obtained. However, as described above, such a scanning distance z cannot be accurately found by the use of the envelope of the amplitude of the white light fringes.

Consequently, in the three-dimensional shape measuring apparatus, the envelope of the amplitude of the white light fringes is used to roughly estimate an approximate position where the contrast of the white light fringes is set the maximum. Thereafter, phase information of the three interference fringe signals $I_R(Z)$, $I_G(z)$ and $I_B(Z)$ is further utilized to more accurately determine the position where the white light fringes have the maximum contrast within the roughly estimated range. In the three-dimensional shape measuring apparatus, the position where the white light fringes have the maximum contrast can be measured with high accuracy and high resolution by adopting such a two-step method.

Figure 4:
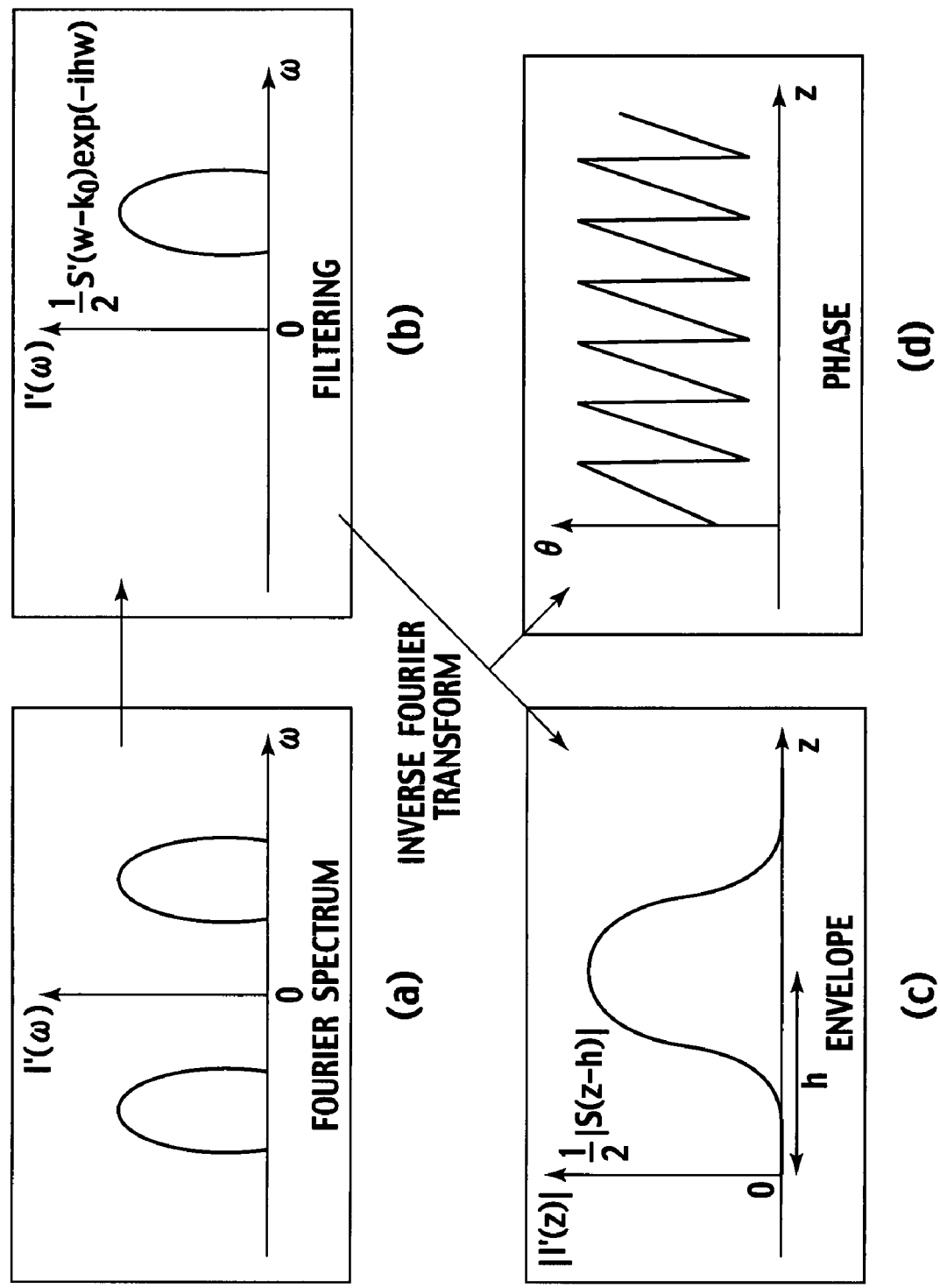
FIG. 4 is a graph showing procedures for finding an envelope of the amplitude of white light fringes and phases of the three interference fringe signals $I_R(Z)$, $I_G(z)$ and $I_B(Z)$ in the three-dimensional shape measuring apparatus according to the first embodiment.

FIG. 4 is a graph showing procedures for finding the envelope of the amplitude of the white light fringes and phases of the three interference fringe signals $I_R(Z)$, $I_G(z)$ and $I_B(Z)$.

Figure 5:
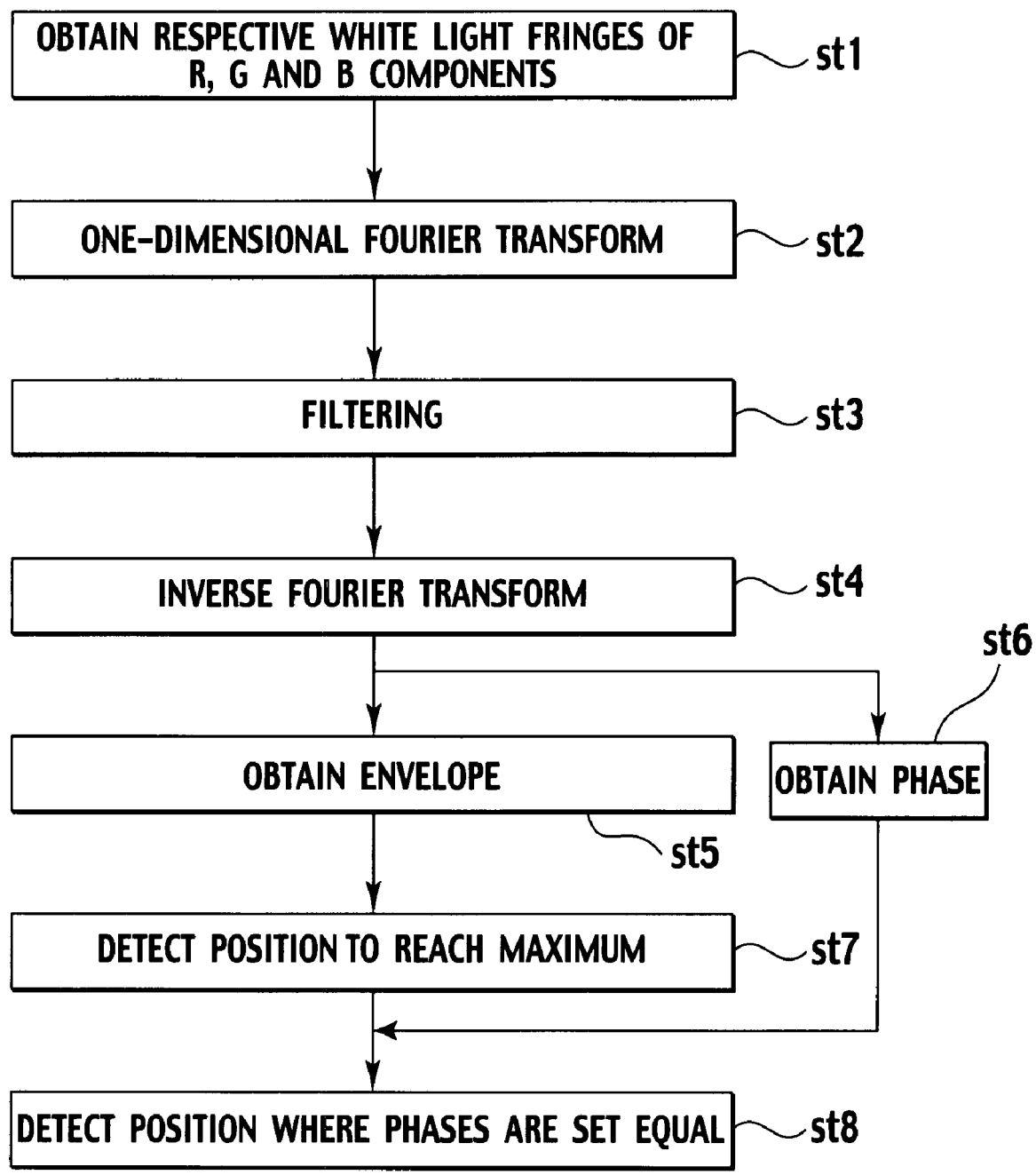
FIG. 5 is a flowchart showing the procedures for finding the envelope of the amplitude of the white light fringes and the phases of the three interference fringe signals $I_R(Z)$, $I_G(Z)$ and $I_B(Z)$ in the three-dimensional shape measuring apparatus according to the first embodiment.

Moreover, FIG. 5 is a flowchart showing the procedures for finding the envelope of the amplitude of the white light fringes and the phases of the three interference fringe signals $I_R(Z)$, $I_G(z)$ and $I_B(Z)$.

Specifically, in the three-dimensional shape measuring apparatus, when the three interference fringe signals $I_R(Z)$, $I_G(Z)$ and $I_B(z)$ are obtained as shown in Step st1 in FIG. 5, first, the obtained interference fringe signals $I_R(Z)$, $I_G(z)$ and $I_B(Z)$ are Fourier transformed, respectively, as shown in FIG. 4(a) by the use of the following equation (4) to find $I'(\omega)$ (Step st2 in FIG. 5).

$$I'(\omega) = F[I(z)] = A(\omega) + (S'(\omega - k_0)e^{ih\omega})/2 + (S'^*[-(\omega + k_0)]e^{ih\omega})/2 \quad \text{(Equation 4)}$$

(as $A(\omega)$ and $S'(\omega)$ are obtained by Fourier transforming a and S, respectively)

Next, only a positive frequency spectrum except a direct-current term is taken out by filtering as shown in FIG. 4 (b) (Step st3 in FIG. 5). Thereafter, inverse Fourier transform is performed (Step st4 in FIG. 5).

Subsequently, by finding an absolute value of amplitude of the inverse Fourier transformed signal, an envelope of amplitude of each of the interference fringe signals $I_R(Z)$, $I_G(Z)$ and $I_B(Z)$ can be found as shown in FIG. 4 (c) by the use of the following equation (5) (Step st5 in FIG. 5).

[Formula 1]

$(|\Gamma(z)|)$

[Formula 2]

$$|\Gamma(z)| = |F^{-1}[\Gamma(\omega)]| = |S(z-h)|/2 \quad \text{(Equation 5)}$$

Moreover, a phase θ of each of the interference fringe signals $I_R(z)$, $I_G(z)$ and $I_B(z)$ is found from the signal inverse Fourier transformed in Step st4 in FIG. 5 as shown in FIG. 4(d) by the use of the following equation (6).

[Formula 3]

$$\theta = \tan^{-1}(Im[\Gamma(z)]/Re[\Gamma(z)]) \quad \text{(Equation 6)}$$

By taking the procedures as described above, the envelope of the amplitude of the interference fringes and the phase are found for each of the color components, R, G and B. Here, by the use of the envelope of the amplitude of one of the interference fringe signals $I_R(Z)$, $I_G(Z)$ and $I_B(Z)$ or the white light fringes obtained by superimposing those signals, an approximate position where the contrast of the white light fringes is set the maximum is roughly estimated (Step st7 in FIG. 5).

Figure 6:
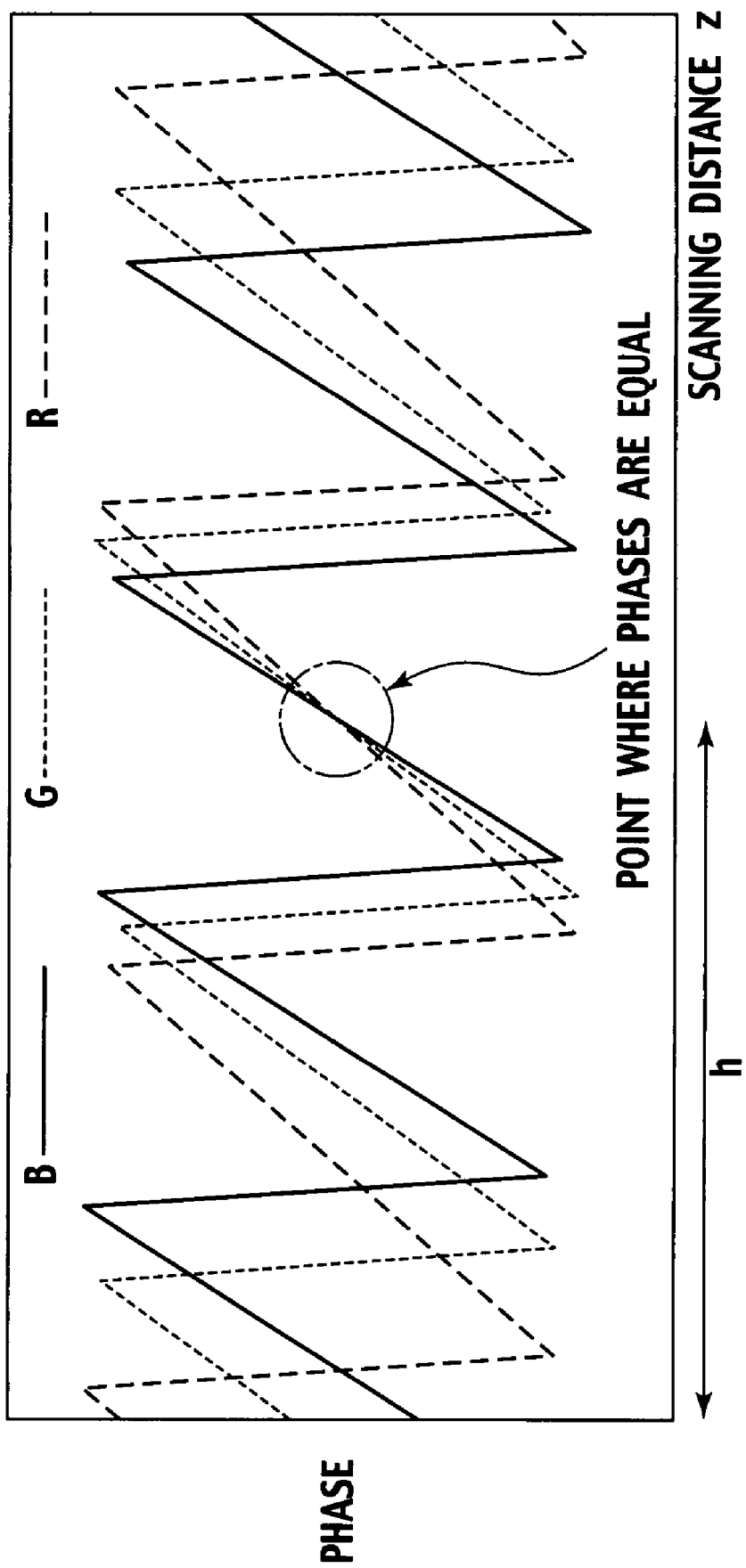
FIG. 6 is a graph showing the phases obtained for the respective interference fringe signals $I_R(Z)$, $I_G(z)$ and $I_B(Z)$ while superimposing the phases on each other in the three-dimensional shape measuring apparatus according to the first embodiment.

FIG. 6 is a graph showing the phases obtained for the respective interference fringe signals $I_R(Z)$, $I_G(z)$ and $I_B(Z)$ while superimposing the phases on each other.

As shown in FIG. 6, the phases of the respective interference fringe signals $I_R(Z)$, $I_G(Z)$ and $I_B(Z)$ have values different from each other. However, at the position where the contrast of the white light fringes is set the maximum, the phases of the respective signals are set to have values equal to each other. This is when the scanning distance (z) of the object 7 to be measured or the reference mirror 6 is equal to the height (h) of the object 7 to be measured (Z=h), as can be understood from the equations (1) to (3) described above.

Specifically, the height (h) of the object 7 to be measured is found by detecting a position where the phases of the respective interference fringe signals $I_R(Z)$, $I_G(z)$ and $I_B(Z)$ are set to have values equal to each other at the approximate position where the contrast of the white light fringes is set the maximum, which is roughly estimated in Step st7 in FIG. 5 (Step st8 in FIG. 5).

In the three-dimensional shape measuring apparatus, as described above, the approximate position where the amplitude of the white light fringes is set the maximum is previously found by the use of the envelope. Thereafter, a point where the phase values of the interference fringe signals of the respective colors are set equal to each other is found near the position previously obtained. Thus, the height information h can be found with high accuracy and high resolution.

Figure 7:
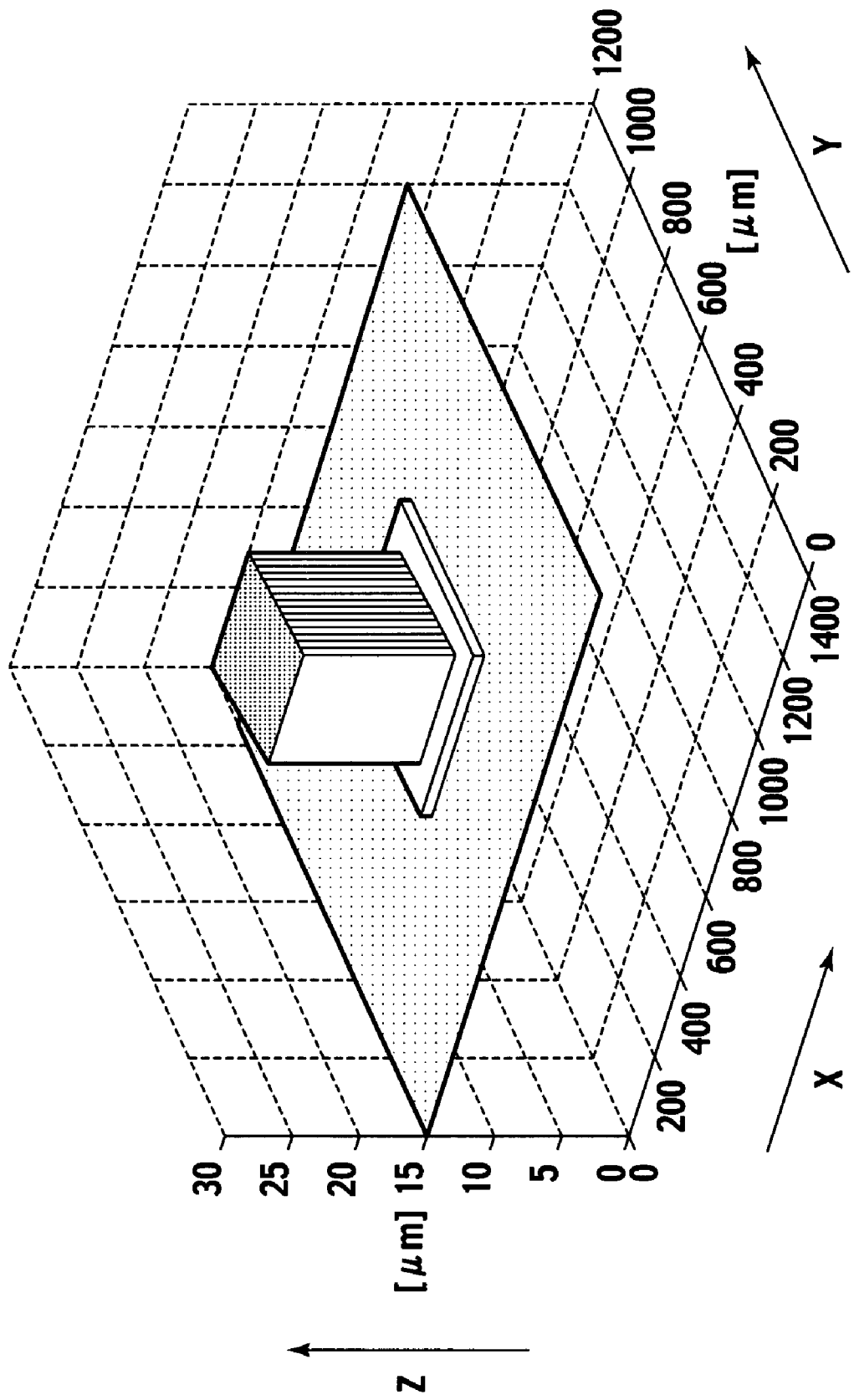
FIG. 7 is a graph showing height information h on three-dimensional coordinates, the height information h being obtained by the three-dimensional shape measuring apparatus according to the first embodiment.

FIG. 7 is a graph showing the height information h, which is found in the three-dimensional shape measuring apparatus, on three-dimensional coordinates.

The above description was given of processing for one pixel in the area having a size of 200 μm×200 μm in directions X and Y as shown in FIG. 7, for example. The height information h found by performing the same processing for all the pixels is shown on the three-dimensional coordinates. Thus, as shown in FIG. 7, the shape of the object 7 to be measured can be shown. Note that the position of one pixel to be processed can be arbitrarily set.

Meanwhile, in the three-dimensional shape measuring apparatus, when there are a plurality of points where the phase values of the interference fringe signals of the respective colors are set equal to each other within the approximate range previously found by the use of the envelope as the position where the amplitude of the white light fringes is set the maximum, it becomes unclear which one of the points indicates correct height information h. As is well known in two-wavelength interference measurement using a laser, and the like, in the case where central wavelengths of two spectral bands are $\lambda_G$ and $\lambda_R$, a point where the phase values of the interference fringe signals of the two colors is repeated at an interval of a synthetic wavelength $\Lambda_{RG}$ (as $\Lambda_{RG} = \lambda_R \lambda_G/(\lambda_R - \lambda_G)$). However, in the three-dimensional shape measuring apparatus, since a broadband light having a short coherence length is used, a range in which the white light fringes exist is limited to a range smaller than this period. Thus, there is never a case where a plurality of points where the phase values of the lights of two colors coincide with each other are included near the position where the contrast of the white light fringes is set the maximum.

The principles have been described above by taking as an example the case where wavelength dispersion of an object or a transmitting medium can be ignored as in measurement of a specular object in air. Meanwhile, in the case where there is wavelength dispersion and dependence of a phase change on wavelengths in reflection or scattering cannot be ignored as in glass, body tissues, thin films and the like, for example, a positional shift may occur between a point where the phase values coincide with each other in combination of R and G and a point where the phase values coincide with each other in combination of R and B. However, in the case where a medium or a sample is homogeneous and dispersion characteristics thereof are not dependent on locations, a positional shift in the point where the phase values coincide with each other due to a difference in combination of wavelengths is set constant irrespective of observation locations. Therefore, a variation in measurement results due to the use of combination of the two wavelengths, for example, R and G or R and B is merely because a certain bias equivalent to the positional shift is applied to a height distribution. Thus, even if the medium or the sample has wavelength dispersion as described above, there is no influence on three-dimensional shape measurement.

Moreover, in the three-dimensional shape measuring apparatus, the phase information of the respective interference fringe signals $I_R(Z)$, $I_G(Z)$ and $I_B(Z)$ is information represented by straight lines as shown in FIG. 6. Thus, even if interposition is carried out between data (sample points) to be adopted, an error caused by such interposition never lowers accuracy of identifying the point where the phase values of the respective interference fringe signals are set equal to each other.

Note that the present invention is not limited to the procedures as described above for finding the point where the phase values of the interference fringe signals of the respective colors are set equal to each other. A phase shift method or other heretofore known phase detection methods may be used.

Second Embodiment

Figure 8:
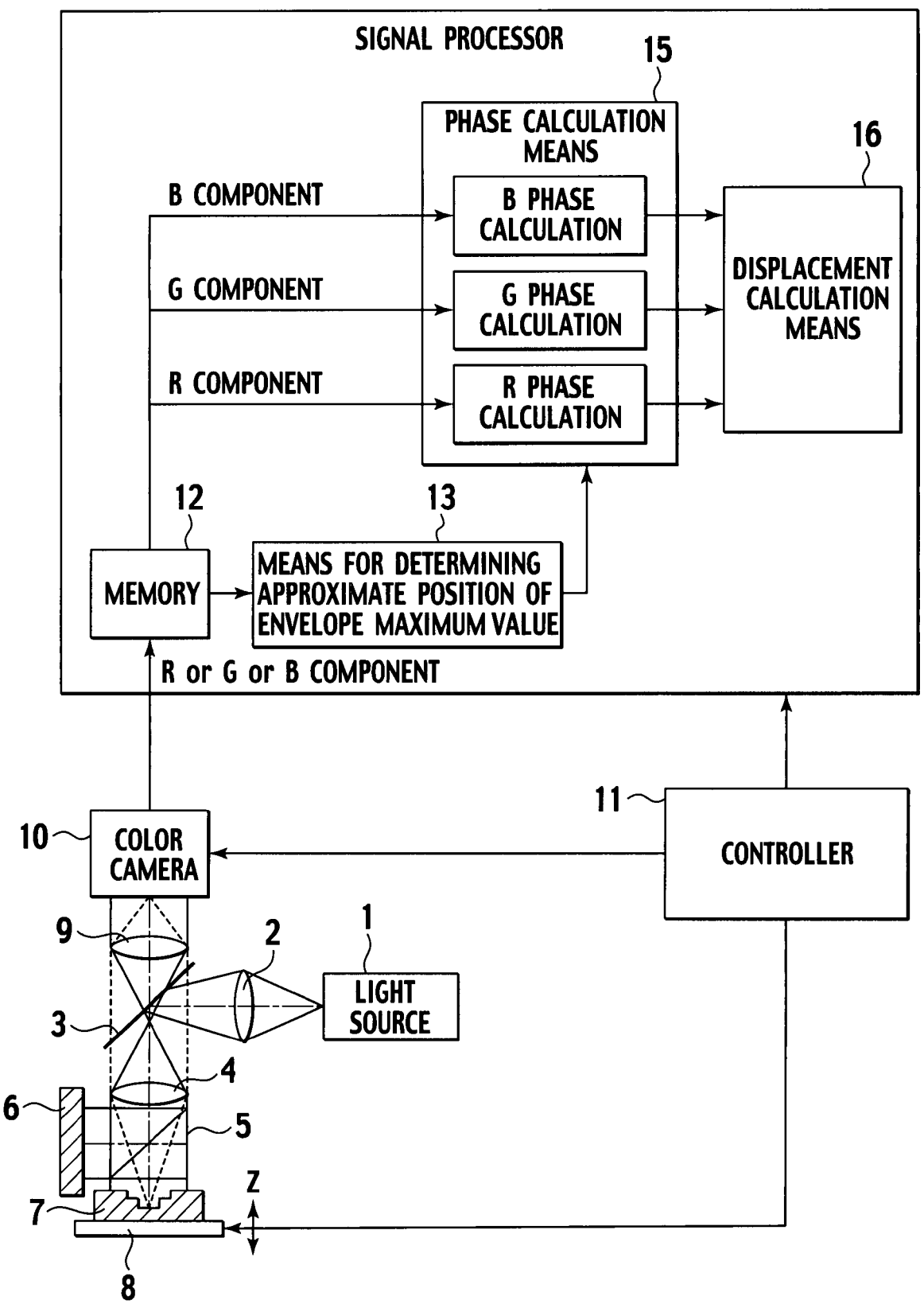
FIG. 8 is a block diagram showing an entire configuration of a three-dimensional shape measuring apparatus according to a second embodiment.

FIG. 8 is a block diagram showing an entire configuration of a three-dimensional shape measuring apparatus according to a second embodiment of the present invention.

The three-dimensional shape measuring apparatus according to this embodiment is a three-dimensional shape measuring apparatus for measuring a three-dimensional shape of an object 7 to be measured. As shown in FIG. 8, the apparatus includes: a light source 1 generating an illumination light having a broadband spectrum, such as a white light source; optical path formation means (a beam splitter 5) for forming optical paths for the illumination light outputted from the light source 1 to reach a reference mirror 6 and the object 7 to be measured; optical path length changing means (a piezoelectric element 8) for changing an optical path length from the light source 1 to the object 7 to be measured or an optical path length from the light source 1 to the reference mirror 6; and detection means for detecting a position where the respective optical path lengths are set equal to each other.

As the light source 1, it is possible to use a light source, such as a halogen lamp, a xenon lamp, a mercury lamp, a metal halide lamp, an SLD (super luminescence diode) and an LED (light emitting diode), which generates an illumination light having a sufficient broadband spectrum to determine an approximate position including a position where an envelope of the amplitude of white light fringes takes a maximum value as described later.

In the three-dimensional shape measuring apparatus, the illumination light emitted from the light source 1 is converged into a light beam by a condenser lens 2. Thereafter, the light beam is reflected by a half mirror 3, converted into a parallel light beam by an objective lens 4 and entered into a beam splitter 5 to be the optical path formation means. The light beam entering into the beam splitter 5 is divided into two halves by the beam splitter 5.

The beam splitter 5 forms the optical paths for the illumination light to reach the reference mirror 6 and the object 7 to be measured. Specifically, one of the two halves obtained by dividing the light beam by the beam splitter 5 is entered into the reference mirror 6 and reflected by the reference mirror 6. Meanwhile, the other half of the light beam divided by the beam splitter 5 is entered into the object 7 to be measured and reflected by the object 7 to be measured. The object 7 to be measured can be moved in an optical axis direction (Z axis direction) by the piezoelectric element 8 to be the optical path length changing means.

A first return light of the illumination light reflected from the reference mirror 6 and a second return light of the illumination light reflected from the object 7 to be measured are entered into the beam splitter 5 again, respectively, and superimposed on each other in the beam splitter 5. Note that the object 7 to be measured may be any of a reflector made of metal or the like and a continuum (diffuser) such as eyegrounds and skin or may be a dielectric multilayer film or the like to be measured for its film thickness.

The first and second return lights superimposed in the beam splitter 5 are transmitted through the half mirror 3 after passing through the objective lens 4, converted into a parallel light beam by a relay lens 9, and entered into a color camera 10 to be imaging means. In this embodiment, the imaging means is the color camera 10 as in the foregoing embodiment, which is a camera having a function of separating the light into three colors, for example, R (red component), G (green component) and B (blue component) for measuring interference fringes. Moreover, the color camera 10 outputs an imaging signal for each of spectral band components different from each other.

The color camera 10 includes the three color separation function by receiving the incident white light through a colored filter, an optical element having spectral transmission characteristics, such as a dichroic mirror, or a color separation prism formed by combining those described above. In the color camera 10, for the incident light beam, independent interference fringes for the respective R, G and B components are recorded. Each of the R, G and B components has a certain wavelength interval (band).

Note that it is only necessary for the color camera 10 to be able to extract interference fringes of at least two spectral band components different from each other, which are included in the white light fringes. Moreover, the spectral band components are not necessarily limited to R, G and B. The color camera 10 is operated under control of a controller 11. As the controller 11, for example, a personal computer can be used.

In the three-dimensional shape measuring apparatus, for detecting a position where the optical path length from the light source 1 to the object 7 to be measured and the optical path length from the light source 1 to the reference mirror 6 are set equal to each other, in other words, a position where an optical path difference is set 0, a plurality of interference fringes are sequentially recorded while relatively changing the optical path difference by using the piezoelectric element 8 to scan the object 7 to be measured (or the reference mirror 6) in the optical axis direction.

Moreover, the three-dimensional shape measuring apparatus includes a signal processor as the detection means for detecting the position where the optical path length from the light source 1 to the object 7 to be measured and the optical path length from the light source 1 to the reference mirror 6 are set equal to each other. Each of functional blocks included in the signal processor is operated under control of the controller 11.

In the signal processor, the imaging signal outputted from the color camera 10 is stored in a memory 12, read from the memory 12, and transmitted to approximate position determination means 13. On the basis of using a signal indicating light intensity of white light fringes caused by interference between the first and second return lights, the approximate position determination means 13 determines an approximate position including a position where an envelope of amplitude of the white light fringes takes a maximum value.

Figure 9:
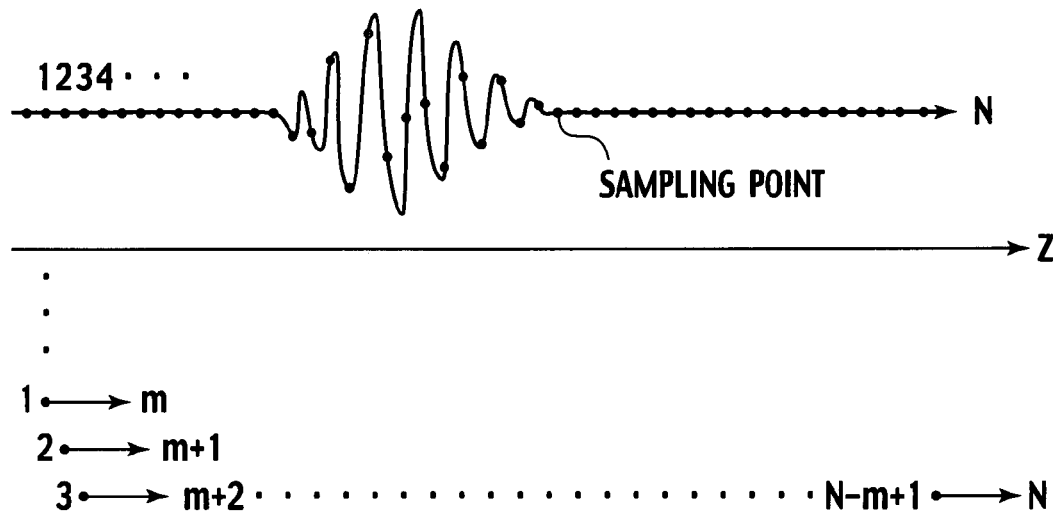
FIG. 9 is a graph showing operations of approximate position determination means in the three-dimensional shape measuring apparatus according to the second embodiment.

FIG. 9 is a graph showing operations of the approximate position determination means in the three-dimensional shape measuring apparatus according to the second embodiment of the present invention.

In this embodiment, as shown in FIG. 9, the approximate position determination means 13 determines the approximate position including the position where the envelope of the amplitude of the white light fringes takes a maximum value by calculating standard deviations by a certain degree in the Z axis direction for the light intensity of the white light fringes caused by the interference between the first and second return lights.

Figure 10:
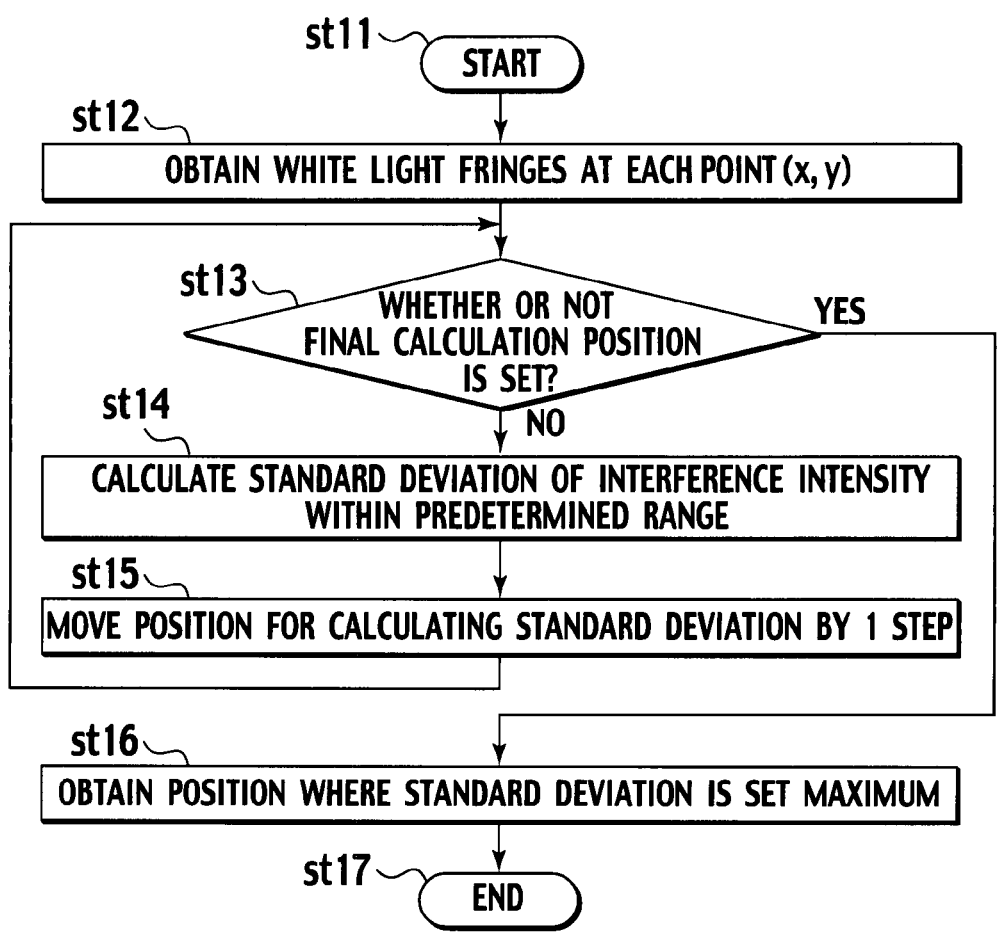
FIG. 10 is a flowchart showing the operations of the approximate position determination means in the three-dimensional shape measuring apparatus according to the second embodiment.

FIG. 10 is a flowchart showing the operations of the approximate position determination means in the three-dimensional shape measuring apparatus according to the second embodiment of the present invention.

Specifically, as shown in FIG. 10, the approximate position determination means 13 starts its operations in Step st11 and advances to Step st12 to obtain information (light intensity signal at each point (x, y)) about the light intensity of the white light fringes caused by the interference between the first and second return lights. Specifically, sampling of the light intensity is performed every time the optical path length is changed by a certain degree (change in the Z axis direction) by the piezoelectric element 8. Thereafter, results of the sampling are stored in the memory, and the processing advances to Step st13.

In Step st13, it is determined whether or not a final position to calculate a standard deviation is reached. The processing advances to Step st16 if the final position is reached, and advances to Step st14 if the final position is not reached.

In Step st14, a standard deviation of a fixed number m of consecutive sampling values starting from an nth (as n is a natural number and is 1 in an initial state) sampling value is calculated. Thereafter, the processing advances to Step st15. In calculation of the standard deviation, data is handled as integers without calculating square roots. Thus, the processing can be speeded up. In Step st15, 1 is added to n and the processing returns to Step st13.

The final position determined in Step st13 is a state where, when the number of sampling values of the light intensity is N, a standard deviation of a fixed number m of consecutive sampling values starting from a [N−m+1]th sampling value is calculated. Therefore, by repeatedly executing Steps st13 to st15, a standard deviation of a fixed number m of consecutive sampling values starting from a first sampling value is calculated. Next, a standard deviation of a fixed number m of consecutive sampling values starting from a second sampling value is calculated. Subsequently, standard deviations are sequentially calculated. Thus, the standard deviation of a fixed number m of consecutive sampling values from the [N−m+1]th sampling value is calculated.

When it is determined in Step st13 that the final position to calculate the standard deviation is reached, the processing advances to Step st16. In Step st16, a range including a group of sampling values at which the respective standard deviations calculated are set the maximum is determined to be the approximate position including the position where the envelope of the amplitude of the white light fringes takes a maximum value. Thereafter, the processing advances to Step st17 to be finished.

As shown in FIG. 8, the imaging signals (R, G and B) read from the memory 12 are transmitted to phase calculation means 15. The phase calculation means 15 calculates phases of interference fringes of at least two spectral band components different from each other (R and G, G and B or B and R), which are included in the white light fringes, near the approximate position determined by the approximate position determination means 13. Thereafter, the phase calculation means 15 transmits the calculated phases to displacement calculation means 16. Specifically, the phase calculation means 15 executes the processing from Step st2 to Step st7 in FIG. 5 described above.

On the basis of using the phases of the interference fringes of the spectral band components different from each other (R and G, G and B or B and R), which are found by the phase calculation means 15, the displacement calculation means 16 finds a position where the phases take values equal to each other. Specifically, the displacement calculation means 16 executes the processing of Step st8 in FIG. 5 described above. Thereafter, with reference to an arbitrary surface of the object 7 to be measured, on which the phases are set to the values equal to each other, a displacement on the surface of the object 7 to be measured is found with the change in the Z axis direction by the piezoelectric element 8 (the optical path length changing means).

Third Embodiment

Figure 11:
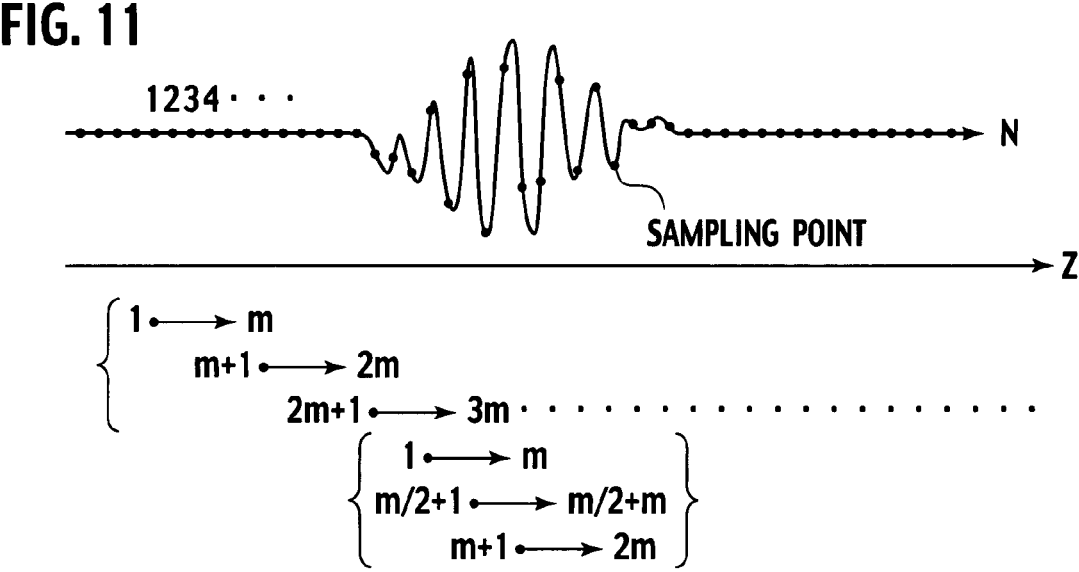
FIG. 11 is a graph showing operations of approximate position determination means in a three-dimensional shape measuring apparatus according to a third embodiment.

FIG. 11 is a graph showing operations of approximate position determination means in a three-dimensional shape measuring apparatus according to a third embodiment of the present invention.

As shown in FIG. 11, approximate position determination means 13 in the three-dimensional shape measuring apparatus of the present invention performs calculation of standard deviations by a certain degree in the Z axis direction, while moving by a fixed number m, for light intensity of white light fringes caused by interference between first and second return lights. Thus, an approximate position including a position where an envelope of amplitude of the white light fringes takes a maximum value can be determined more quickly than the second embodiment described above.

Figure 12:
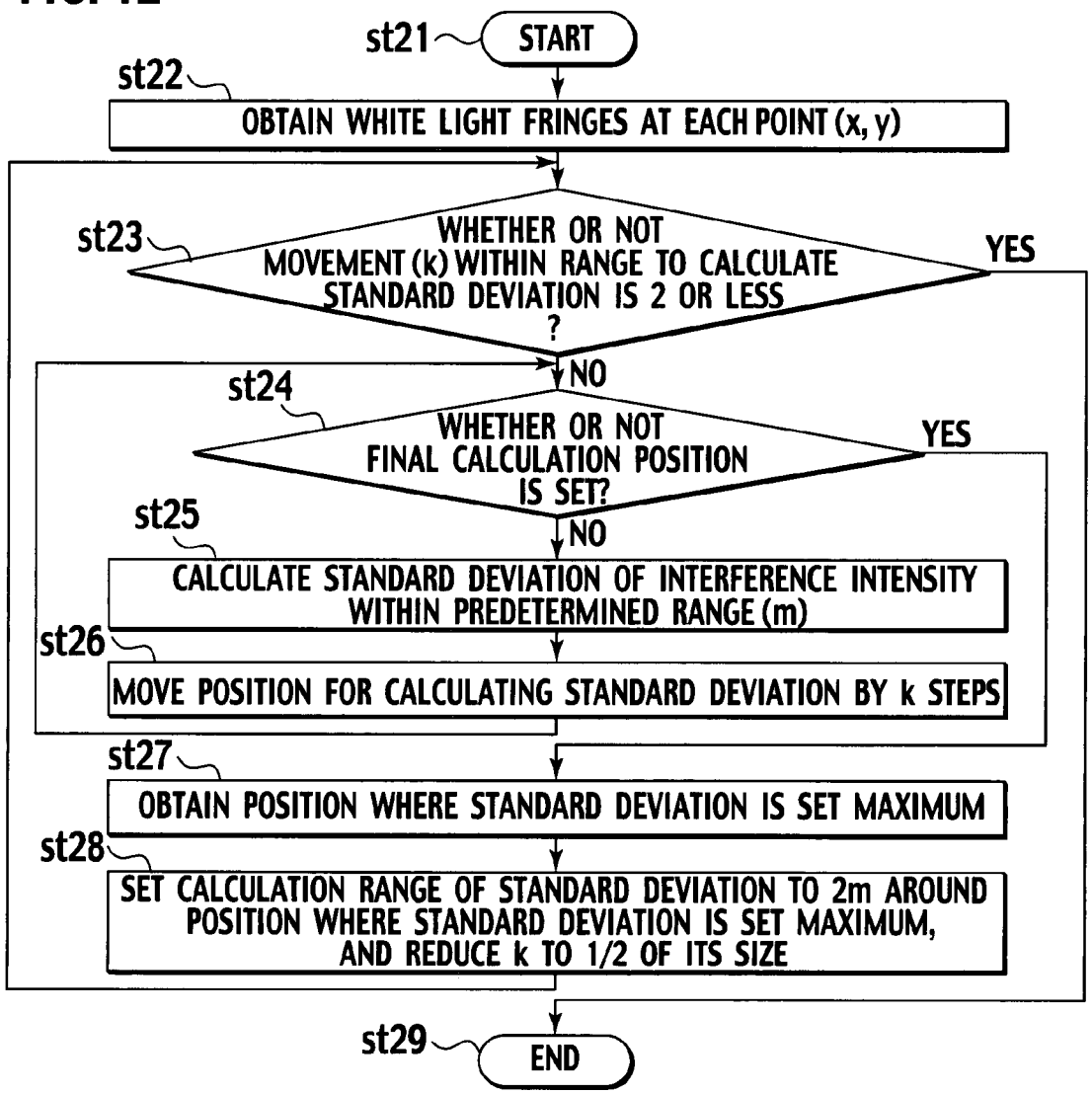
FIG. 12 is a flowchart showing the operations of the approximate position determination means in the three-dimensional shape measuring apparatus according to the third embodiment.

FIG. 12 is a flowchart showing the operations of the approximate position determination means in the three-dimensional shape measuring apparatus according to the third embodiment of the present invention.

Specifically, as shown in FIG. 12, the approximate position determination means 13 starts its operations in Step st21 and advances to Step st22 to obtain information (light intensity signal at each point (x, y)) about the light intensity of the white light fringes caused by the interference between the first and second return lights. Specifically, sampling of the light intensity is performed every time the optical path length is changed by a certain degree (change in the Z axis direction) by the piezoelectric element 8. Thereafter, results of the sampling are stored in the memory, and the processing advances to Step st23.

In Step st23, it is determined whether a movement K within a range to calculate a standard deviation is 2 or less. The processing advances to Step st29 to be finished if the movement K is 2 or less, and advances to Step st24 if the movement K is not 2 or less.

In Step st24, it is determined whether or not a final position to calculate a standard deviation is reached. The processing advances to Step st27 if the final position is reached, and advances to Step st25 if the final position is not reached.

In Step st25, a standard deviation of a fixed number m of consecutive sampling values starting from an nth (as n is a natural number and is 1 in an initial state) sampling value is calculated. Thereafter, the processing advances to Step st26. In calculation of the standard deviation, data is handled as integers without calculating square roots. Thus, the processing can be speeded up. In Step st26, the movement K is added to n and the processing returns to Step st24. An initial value of the movement K is equal to the fixed number m.

The final position determined in Step st24 is a state where, when the number of sampling values of the light intensity is N, calculations for the number of times corresponding to an integer portion of a quotient [N/m] are finished. Therefore, by repeatedly executing Steps st24 to st26, a standard deviation of a fixed number m of consecutive sampling values starting from a first sampling value is calculated. Thereafter, a standard deviation of a fixed number m of consecutive sampling values starting from a [m+1]th sampling value is calculated. Next, a standard deviation of a fixed number m of consecutive sampling values starting from a [2m+1]th sampling value is calculated. Subsequently, standard deviations are sequentially calculated.

When it is determined in Step st24 that the final position to calculate the standard deviation is reached, the processing advances to Step st27. In Step st27, a range including a group of sampling values at which the respective standard deviations calculated are set the maximum is determined. Thereafter, the processing advances to Step st28. After the movement K is set to [K/2] in Step st28, the processing returns to Step st23. In Step st23, it is determined whether the movement K is 2 or less. The processing advances to Step st29 to be finished if the movement K is 2 or less, and advances to Step st24 if the movement K is not 2 or less.

Specifically, by repeatedly executing Steps st23 to st28, within a range including a group of sampling values at which the standard deviations are set the maximum and a group of sampling values adjacent thereto, a standard deviation of a fixed number m of consecutive sampling values starting from a first sampling value is calculated. Thereafter, a standard deviation of a fixed number m of consecutive sampling values starting from a [m/2+1]th sampling value is calculated. Next, a standard deviation of a fixed number m of consecutive sampling values starting from a [2m/2+1]th sampling value is calculated. Subsequently, standard deviations are sequentially calculated to determine the range including the group of sampling values at which the standard deviations are set the maximum.

Furthermore, after the above operations are repeated until the movement K is set to 2 or less, the processing advances to Step st29 to be finished. A range determined when Step st28 is finally executed before the processing advances to Step st29 is set to be an approximate position including a position where an envelope of the amplitude of white light fringes takes a maximum value.

Fourth Embodiment

Figure 13:
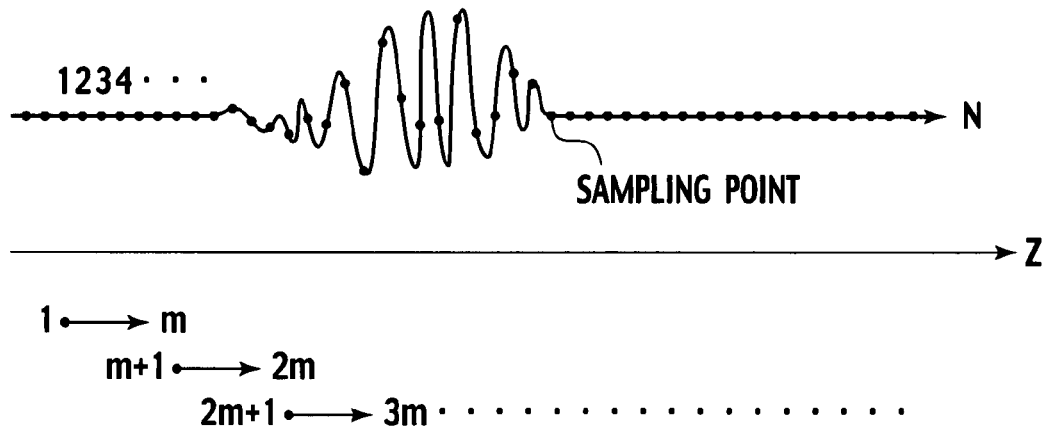
FIG. 13 is a graph showing operations of approximate position determination means in a three-dimensional shape measuring apparatus according to a fourth embodiment.

FIG. 13 is a graph showing operations of approximate position determination means in a three-dimensional shape measuring apparatus according to a fourth embodiment.

As shown in FIG. 13, approximate position determination means 13 in the three-dimensional shape measuring apparatus of the present invention determines an approximate position including a position where an envelope of amplitude of the white light fringes takes a maximum value by calculating an absolute value of a difference at a fixed interval in the Z axis direction for light intensity of white light fringes caused by interference between first and second return lights.

Figure 14:
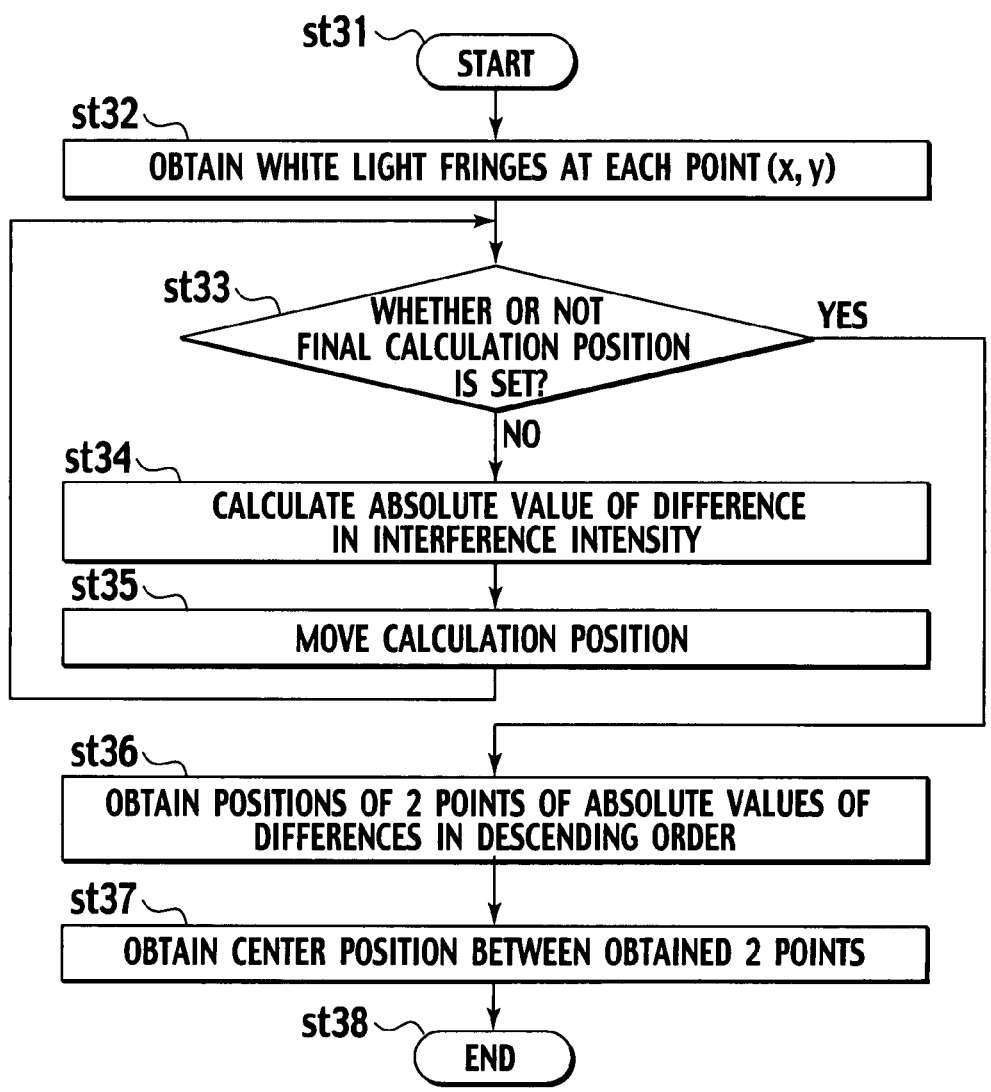
FIG. 14 is a flowchart showing the operations of the approximate position determination means in the three-dimensional shape measuring apparatus according to the fourth embodiment.

FIG. 14 is a flowchart showing the operations of the approximate position determination means in the three-dimensional shape measuring apparatus according to the fourth embodiment of the present invention.

Specifically, as shown in FIG. 14, the approximate position determination means 13 starts its operations in Step st31 and advances to Step st32 to obtain information (light intensity signal at each point (x, y)) about the light intensity of the white light fringes caused by the interference between the first and second return lights. Specifically, sampling of the light intensity is performed every time the optical path length is changed by a certain degree (change in the Z axis direction) by the piezoelectric element 8. Thereafter, results of the sampling are stored in the memory, and the processing advances to Step st33.

In Step st33, it is determined whether or not a final position to perform calculation is reached. The processing advances to Step st36 if the final position is reached, and advances to Step st34 if the final position is not reached.

In Step st34, an absolute value $[|I(Z_{n+m})-I(Z_n)|]$ of a difference between first and last sampling values (as $I(Z_n)$ is the first sampling value and $I(Z_{n+m})$ is the last sampling value) within a range of a fixed number m of consecutive sampling values starting from an nth (as n is a natural number and is 1 in an initial state) sampling value is calculated. Thereafter, the processing advances to Step st35. In Step st35, a movement m is added to n and the processing returns to Step st33. The movement m is equal to the fixed number m. The final position determined in Step st33 is a state where, when the number of sampling values of the light intensity is N, calculations for the number of times corresponding to an integer portion of a quotient [N/m] are finished. Therefore, by repeatedly executing Steps st33 to st35, an absolute value of a difference between first and last sampling values within a range of a fixed number m of consecutive sampling values starting from a first sampling value is calculated. Thereafter, an absolute value of a difference between first and last sampling values within a range of a fixed number m of consecutive sampling values starting from a [m+1]th sampling value is calculated. Next, an absolute value of a difference between first and last sampling values within a range of a fixed number m of consecutive sampling values starting from a [2m+1]th sampling value is calculated. Subsequently, absolute values of differences are sequentially calculated When it is determined in Step st33 that the final position to perform calculation is reached, the processing advances to Step st36. In Step st36, two ranges including a group of sampling values at which the calculated absolute value of the difference is set the maximum are determined. Thereafter, the processing advances to Step st37. In Step st37, a center position between the range including the first absolute value of the difference and the range including the second absolute value of the difference is obtained. Thus, the center position obtained is determined to be the approximate position including the position where the envelope of the amplitude of the white light fringes takes a maximum value. Thereafter, the processing advances to Step st38 to be finished.

Fifth Embodiment

Figure 15:
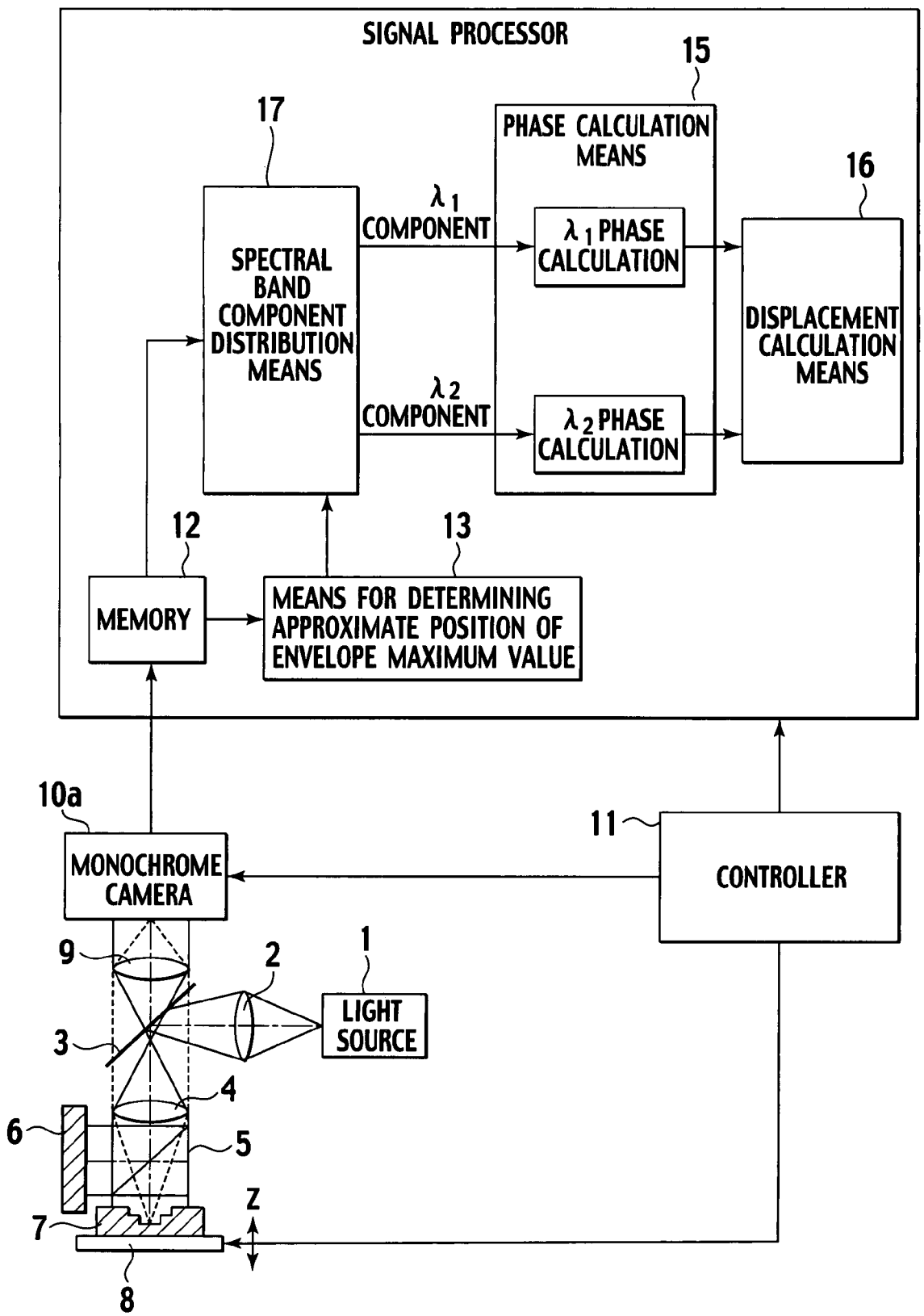
FIG. 15 is a block diagram showing an entire configuration of a three-dimensional shape measuring apparatus according to a fifth embodiment.

FIG. 15 is a block diagram showing an entire configuration of a three-dimensional shape measuring apparatus according to a fifth embodiment of the present invention.

The three-dimensional shape measuring apparatus of the present invention is not limited to the configuration having the color camera 10 as described above as the imaging means. As shown in FIG. 15, the apparatus may have a configuration having a monochrome camera 10a instead of the color camera 10. In the three-dimensional shape measuring apparatus, a part of a spectral distribution obtained by Fourier transforming white light fringe data obtained by the monochrome camera 10a is selected, and data of only a predetermined frequency band is separated by the use of a frequency filter. Thus, it is possible to find the same phase information as that obtained by the color separation in the color camera.

Specifically, in a signal processor in the three-dimensional shape measuring apparatus, an imaging signal outputted from the monochrome camera 10a is stored in a memory 12, read from the memory 12, and transmitted to approximate position determination means 13. On the basis of a signal indicating light intensity of white light fringes caused by interference between first and second return lights, the approximate position determination means 13 determines an approximate position including a position where an envelope of amplitude of the white light fringes takes a maximum value.

The imaging signal generated by the interference between the first and second return lights is transmitted to spectral band component distribution means 17. The spectral band component distribution means 17 selects a part of a spectral distribution obtained by Fourier transforming the imaging signal, which is obtained by the monochrome camera 10a, near the approximate position, and use a frequency filter to separate data of only predetermined frequency bands ($\lambda_1$ and $\lambda_2$). Thus, different spectral band components are separated. Accordingly, the spectral band component distribution means 17 divides the imaging signal outputted from the monochrome camera 10a into spectral band components ($\lambda_1$ component and $\lambda_2$ component) different from each other, and transmits the components to phase calculation means 15. Specifically, the spectral band component distribution means 17 executes the processing of Steps st2 and st3 in FIG. 5 described above.

The phase calculation means 15 calculates phases of interference fringes of at least two spectral band components ($\lambda_1$ component and $\lambda_2$ component) different from each other, which are included in the white light fringes, near the approximate position determined by the approximate position determination means 13, and transmits the calculated phases to displacement calculation means 16. Specifically, the phase calculation means 15 executes the processing from Step st4 to Step st7 in FIG. 5 described above.

On the basis of the phases of the interference fringes of the spectral band components ($\lambda_1$ component and $\lambda_2$ component) different from each other, which are found by the phase calculation means 15, the displacement calculation means 16 finds a position where the phases take values equal to each other. Specifically, the displacement calculation means 16 executes the processing of Step st8 in FIG. 5 described above. Thereafter, with reference to an arbitrary surface of the object 7 to be measured, on which the phases are set to the values equal to each other, a displacement on the surface of the object 7 to be measured is obtained with the change in the Z axis direction by the piezoelectric element 8 (the optical path length changing means).

INDUSTRIAL APPLICABILITY

In the three-dimensional shape measuring method and the three-dimensional shape measuring apparatus according to the present invention, the position where the amplitude of the white light fringes is set the maximum can be specified with high accuracy and high resolution by using amplitude information of the white light fringes and phase information of the interference fringes broken into spectra of R (red), G (green), B (blue) and the like, for example.

Moreover, in the three-dimensional shape measuring method and the three-dimensional shape measuring apparatus according to the present invention, for example, compared with a conventional method for estimating a phase gradient in a spectral region by the use of a least squares method, signal processing is easier and processing time required for operations can be shortened.

Specifically, the present invention can provide a three-dimensional shape measuring apparatus (white light interference measuring apparatus) which measures a three-dimensional shape of an object to be measured by the use of white light fringes, and makes it possible to accurately specify a position where amplitude of the white light fringes is set the maximum while shortening processing time required for operations.

The invention claimed is:

1. A three-dimensional shape measuring method for measuring a three-dimensional shape of an object to be measured by changing an optical path length from a light source generating an illumination light having a broadband spectrum to the object to be measured or an optical path length from the light source to a reference mirror and by detecting a position where the optical path lengths are set equal, the method comprising the steps of:
   finding an approximate position including a position where an envelope of the amplitude of white light fringes takes a maximum value, the fringes being caused by interference between a return light of the illumination light from the reference mirror and a return light of the illumination light from the object to be measured;
   extracting interference fringes of at least two spectral band components different from each other, which are included in the white light fringes; and
   determining a position, near the approximate position, where the optical path length from the light source to the object to be measured is set equal to the optical path length from the light source to the reference mirror by finding a position where phases of the interference fringes of the spectral band components different from each other take values equal to each other.

2. A three-dimensional shape measuring method for measuring a three-dimensional shape of an object to be measured by scanning an optical path length from a light source generating an illumination light having a broadband spectrum to the object to be measured or an optical path length from the light source to a reference mirror by using white light interference, and by detecting a position where the optical path lengths are set equal, the method comprising the steps of:
   finding an envelope distribution of the amplitude of white light fringes, the white light fringes being caused by interference between a return light of the illumination light from the reference mirror and a return light of the illumination light from the object to be measured;
   finding, by the use of the envelope distribution, an approximate position where contrast of the white light fringes is maximized;
   extracting interference fringes of at least two spectral band components different from each other, which are included in the white light fringes;
   finding a position where phases of the interference fringes of the spectral band components different from each other take values equal to each other near the approximate position where the contrast of the white light fringes is maximized; and
   determining, on the basis of the position thus found, a position where the optical path length from the white light source to the object to be measured is set equal to the optical path length from the white light source to the reference mirror.

3. A three-dimensional shape measuring apparatus, which measures a three-dimensional shape of an object to be measured, by detecting a position where optical path lengths are set equal to each other, comprising:
   a light source generating an illumination light having a broadband spectrum;
   optical path formation means for forming optical paths for the illumination light output from the light source to reach a reference mirror and the object to be measured;
   optical path length changing means for changing an optical path length from the light source to the object to be measured or an optical path length from the light source to the reference mirror;
   imaging means into which a first return light of the illumination light, which is a light reflected from the reference mirror, and a second return light of the illumination light, which is a light reflected from the object to be measured, are entered;

approximate position determination means for determining, on the basis of an imaging signal outputted from the imaging means, an approximate position including a position where an envelope of the amplitude of white light fringes takes a maximum value, the fringes being caused by interference between the first return light and the second return light;

phase calculation means for calculating phases of interference fringes of at least two spectral band components different from each other, which are included in the white light fringes, near the approximate position; and displacement calculation means for calculating a displacement on a surface of the object to be measured by finding a position where the phases, found by the phase calculation means, of the interference fringes of the spectral band components different from each other take values equal to each other.

4. The three-dimensional shape measuring apparatus according to claim 3, wherein the approximate position determination means performs sampling of light intensity of the white light fringes every time where the optical path length is changed by a certain fixed degree by the optical path length changing means, calculating a standard deviation of a fixed number of consecutive sampling values starting from a first sampling value, then calculating a standard deviation of a fixed number of consecutive sampling values starting from a second sampling value, then sequentially calculating standard deviation, and determining a range including a group of sampling values to have a maximum standard deviation to be the approximate position including the position where the envelope of the amplitude of the white light fringes takes a maximum value.

5. The three-dimensional shape measuring apparatus according to claim 3, wherein the approximate position determination means performs sampling of light intensity of the white light fringes every time where the optical path length is changed by a certain fixed degree by the optical path length changing means, calculating a standard deviation of a fixed number m of consecutive sampling values starting from a first sampling value, then calculating a standard deviation of a fixed number m of consecutive sampling values starting from a [m+1]th sampling value, then calculating a standard deviation of a fixed number m of consecutive sampling values starting from a [2m+1]th sampling value, then sequentially calculating standard deviations, calculating, within a range including a group of sampling values to have a maximum standard deviation and a group of sampling values adjacent thereto, a standard deviation of a fixed number m of consecutive sampling values starting from a first sampling value, then calculating a standard deviation of a fixed number m of consecutive sampling values starting from a [m/2+1]th sampling value, then calculating a standard deviation of a fixed number m of consecutive sampling values starting from a [2m/2+1]th sampling value, then sequentially calculating standard deviations, and determining a range including a group of sampling values to have the maximum standard deviation to be the approximate position including the position where the envelope of the amplitude of the white light fringes takes a maximum value.

6. The thee-dimensional shape measuring apparatus according to claim 3, wherein the approximate position determination means performs sampling of light intensity of the white light fringes every time where the optical path length is changed by a certain fixed degree by the optical path length changing means, calculating an absolute value of a difference between first and last sampling values within a range of a fixed number m of consecutive sampling values starting from a first sampling value, then calculating an absolute value of a difference between first and last sampling values within a range of a fixed number m of consecutive sampling values starting from a [m+1]th sampling value, then calculating an absolute value of a difference between first and last sampling values within a range of a fixed number m of consecutive sampling values starting from a [2m+1]th sampling value is calculated, then sequentially calculating absolute values of differences, and determining a range including a group of sampling values to have a maximum absolute value of a difference to be the approximate position including the position where the envelope of the amplitude of the white light fringes takes a maximum value.

7. The three-dimensional shape measuring apparatus according to claim 3, wherein the imaging means is a color camera and outputs the imaging signal for each of the spectral band components different from each other.

8. The three-dimensional shape measuring apparatus according to claim 3, wherein the imaging means is a monochrome camera and includes spectral band component distribution means for distributing imaging signals, outputted from the monochrome camera, to the spectral band components different from each other.

9. The three-dimensional shape measuring apparatus according to claim 4, wherein the imaging means is a color camera and outputs the imaging signal for each of the spectral band components different from each other.

10. The three-dimensional shape measuring apparatus according to claim 4, wherein the imaging means is a monochrome camera and includes spectral band component distribution means for distributing imaging signals, outputted from the monochrome camera, to the spectral band components different from each other.

11. The three-dimensional shape measuring apparatus according to claim 5, wherein the imaging means is a color camera and outputs the imaging signal for each of the spectral band components different from each other.

12. The three-dimensional shape measuring apparatus according to claim 5, wherein the imaging means is a monochrome camera and includes spectral band component distribution means for distributing imaging signals, outputted from the monochrome camera, to the spectral band components different from each other.

13. The three-dimensional shape measuring apparatus according to claim 6, wherein the imaging means is a color camera and outputs the imaging signal for each of the spectral band components different from each other.

14. The three-dimensional shape measuring apparatus according to claim 6, wherein the imaging means is a monochrome camera and includes spectral band component distribution means for distributing imaging signals, outputted from the monochrome camera, to the spectral band components different from each other.

* * * * *